(12) United States Patent
Tensaka

(10) Patent No.: US 9,630,257 B2
(45) Date of Patent: Apr. 25, 2017

(54) CUTTING INSERT

(71) Applicant: SUMITOMO ELECTRIC HARDMETAL CORP., Itami-shi, Hyogo (JP)

(72) Inventor: Yousei Tensaka, Itami (JP)

(73) Assignee: SUMITOMO ELECTRIC HARDMETAL CORP., Itami-shi (JP)

( * ) Notice: Subject to any disclaimer, the term of this patent is extended or adjusted under 35 U.S.C. 154(b) by 227 days.

(21) Appl. No.: 14/385,972

(22) PCT Filed: Mar. 11, 2013

(86) PCT No.: PCT/JP2013/056618
§ 371 (c)(1),
(2) Date: Sep. 17, 2014

(87) PCT Pub. No.: WO2013/146211
PCT Pub. Date: Oct. 3, 2013

(65) Prior Publication Data
US 2015/0043982 A1 Feb. 12, 2015

(30) Foreign Application Priority Data

Mar. 30, 2012 (JP) .................................. 2012-078610

(51) Int. Cl.
B23C 5/20 (2006.01)
B23B 27/16 (2006.01)
B23B 27/14 (2006.01)

(52) U.S. Cl.
CPC ........ *B23B 27/1607* (2013.01); *B23B 27/143* (2013.01); *B23B 2200/081* (2013.01);
(Continued)

(58) Field of Classification Search
CPC .......... B23C 2200/32; B23C 2200/323; B23C 2200/081; B23C 5/205; B23B 27/1607;
(Continued)

(56) References Cited

U.S. PATENT DOCUMENTS 4,087,193 A * 5/1978 Mundy ................. B23B 27/141
407/114
4,367,990 A * 1/1983 Porat ..................... B23B 27/143
407/114

(Continued)

FOREIGN PATENT DOCUMENTS

CA 2779195 A1 5/2011
GB 2 055 636 A 3/1981
(Continued)

OTHER PUBLICATIONS

Nov. 4, 2015 Office Action issued in Chinese Patent Application No. 201380018429.7.
(Continued)

Primary Examiner — Daniel Howell
Assistant Examiner — Alan Snyder
(74) Attorney, Agent, or Firm — Oliff PLC

(57) ABSTRACT

A cutting insert includes a land and a breaker flute on a rake face, the land providing a cutting edge by intersecting a flank face. The breaker flute includes breakers. A width T of a portion of the land that extends along a portion of the cutting edge that is at a round corner portion is 0.05 mm<T<0.15 mm. A plurality of crest portions each extending over the entirety of the portion of the cutting edge that is at the round corner portion are provided on a sloping surface of the breaker flute that is on a land side. The crest portions are arranged side by side in a depth direction of the breaker flute. A rake angle θ of at least one of inclined surfaces that form each of the crest portions is expressed as θ>20°.

10 Claims, 3 Drawing Sheets

(52) U.S. Cl.
CPC ..... *B23B 2200/085* (2013.01); *B23B 2200/28* (2013.01); *B23B 2200/321* (2013.01); *B23B 2200/3645* (2013.01); *Y10T 407/235* (2015.01)

(58) Field of Classification Search
CPC ............ B23B 27/143; B23B 2200/081; B23B 2200/321; Y10T 407/235
See application file for complete search history.

(56) References Cited

U.S. PATENT DOCUMENTS

| | | | |
|---|---|---|---|
| 4,915,548 A * | 4/1990 | Fouquer | B23B 27/143 407/114 |
| 2002/0090272 A1* | 7/2002 | Waggle | B23B 27/141 407/114 |

FOREIGN PATENT DOCUMENTS

| | | |
|---|---|---|
| GB | 2 127 722 A | 4/1984 |
| JP | A-49-32280 | 3/1974 |
| JP | U-51-115686 | 9/1976 |
| JP | S5528404 Y2 | 7/1980 |
| JP | U-59-66510 | 5/1984 |
| JP | S6322003 Y2 | 6/1988 |
| JP | A-02-139104 | 5/1990 |
| JP | U-04-17004 | 2/1992 |
| JP | A-06-170634 | 6/1994 |
| JP | A-06-190612 | 7/1994 |
| JP | A-2002-103107 | 4/2002 |
| JP | 2002301606 A | 10/2002 |
| JP | 2007260841 A | 10/2007 |

OTHER PUBLICATIONS

Apr. 2, 2013 International Search Report issued in International Application No. PCT/JP2013/056618.

Oct. 5, 2015 Extended Search Report issued in European Patent Application No. 13768578.0.

\* cited by examiner

CUTTING INSERT

TECHNICAL FIELD

The present invention relates to a cutting insert that exerts excellent performance in chip treatment and in life in the rough machining of difficult-to-cut materials such as titanium, titanium alloys, and Ni alloys.

BACKGROUND ART

In recent years, there has been a tendency toward frequent use of structural members and the like made of difficult-to-cut materials such as titanium, and the number of situations in which such difficult-to-cut materials are cut has been increasing. In the machining of such difficult-to-cut materials, cutting inserts including chip breakers intended for stainless steel are exclusively used.

In the process of cutting stainless steel, a cutting insert disclosed by PTL 1 listed below or a cutting insert disclosed by PTL 2 listed below, for example, are used.

The cutting insert disclosed by PTL 1 includes a flat land for edge reinforcement that is provided on a rake face extending along a cutting edge. The land has a width of about 0.15 to 0.25 mm. The cutting insert further includes a breaker flute that is continuous with the land, and a breaker projection that is provided between the breaker flute and a central land portion of the cutting insert.

The cutting insert disclosed by PTL 2 includes a breaker flute provided in each of rake faces that intersect a flank face at acute angles, respectively, and a breaker projection provided between the breaker flute and a central land portion of the cutting insert.

In a case where the latter cutting insert is used for the machining of stainless steel, a rake face having a rake angle of smaller than 20° and a width of about 0.5 mm at most is provided along the cutting edge. Furthermore, a breaker flute having an inclination of larger than 20° C. is provided at a terminal end (a side that is farther from the cutting edge is regarded as the terminal end) of the rake face.

CITATION LIST

Patent Literature

PTL 1: Japanese Unexamined Patent Application Publication No. 6-190612
PTL 2: Japanese Unexamined Patent Application Publication No. 2002-101107

SUMMARY OF INVENTION

Technical Problem

In the machining of a difficult-to-cut material such as titanium, crater wear progresses significantly near the edge. Therefore, the configuration disclosed by PTL in which the flat land that produces an edge-reinforcing effect is provided along the cutting edge is beneficial in terms of life. However, a cutting insert including a flat land having a large width cannot break chips in good manners. Therefore, long chips are generated, hindering the machining work.

Meanwhile, the configuration disclosed by PTL 2 that includes no lands provides high sharpness and is superior in chip-treatment performance to those that include lands. However, since the thickness at an edge portion is small, the edge tends to fracture with the progress of crater wear, leading to a problem of a short life.

The present invention provides a cutting insert having an improved shape so that a long life and good chip-treatment performance are both realized while crater wear is suppressed even in the machining of a difficult-to-cut material.

Solution to Problem

To solve the above problems, the present invention provides the following cutting insert that includes a cutting edge at a round corner portion. Specifically, the cutting insert includes a land and a breaker flute that are provided on a rake face, the land providing the cutting edge by intersecting a flank face, the breaker flute being continuous with the land; and a breaker on a side of the breaker flute that is nearer to a central land portion.

A width T of a portion of the land that extends along a portion of the cutting edge that is at the round corner portion is 0.05 mm<T<0.15 mm.

A plurality of crest portions are provided on a sloping surface of the breaker flute, the sloping surface being on a land side and forming a downslope in a direction away from the cutting edge, the crest portions extending along the entirety of the portion of the cutting edge that is at the round corner portion, the crest portions being arranged side by side in a depth direction of the breaker flute (a direction along the bottom of the flute).

A rake angle $\theta$ of at least one of inclined surfaces that form each of the crest portions satisfies a condition of $\theta > 20$.

Preferable modes of the cutting insert are listed below.

(1) Each of the crest portions provided on the sloping surface of the breaker flute is formed of two inclined surfaces A and B having respectively different rake angles and intersecting each other. A rake angle $\theta A$ of the inclined surface A that is on the land side and a rake angle $\theta B$ of the inclined surface B that is on a breaker side satisfy a condition of $\theta A < \theta B$. A width WA of the inclined surface A and a width WB of the inclined surface B satisfy a condition of $WA < WB$.

(2) The rake angles $\theta A$ zinc $\theta B$ of the inclined surfaces A and B are expressed as $\theta A \geq 20°$ and $\theta B \geq 30°$, respectively.

(3) The width of the land falls within a range of 0.07 mm $\leq T < 0.15$ mm.

Advantageous Effects of Invention

The cutting insert according to the present invention includes the land extending along the cutting edge. Therefore, the thickness of an edge portion is increased, and the edge is reinforced. However, only the reinforcement of the edge by providing the land does not effectively prevent the progress of crater wear.

To break chips while maintaining the sharpness, the width T of the land is made smaller than 0.15 mm. Hence, the effect of reinforcement of the edge by providing the land is limited.

According to the present invention, the insufficiency in the reinforcement of the edge by providing the land is compensated for by the crest portions provided on the sloping surface of the breaker flute that is on the land side. That is, since the plurality of crest portions are provided, the thickness near the edge is larger than in a configuration having no crest portions, whereby the strength of the edge is increased. Furthermore, since the plurality of crest portions are arranged side by side in the depth direction of the breaker flute, chips locally come into contact with the rake face (a flute surface of the breaker flute) and the contact pressure are varied, which are also effective. With a combination of the above effects, the progress of crater wear is suppressed.

Hence, according to the present invention, good chip-treatment performance and a longer life with suppressed crater wear are both realized.

DESCRIPTION OF EMBODIMENTS

Figure 1:
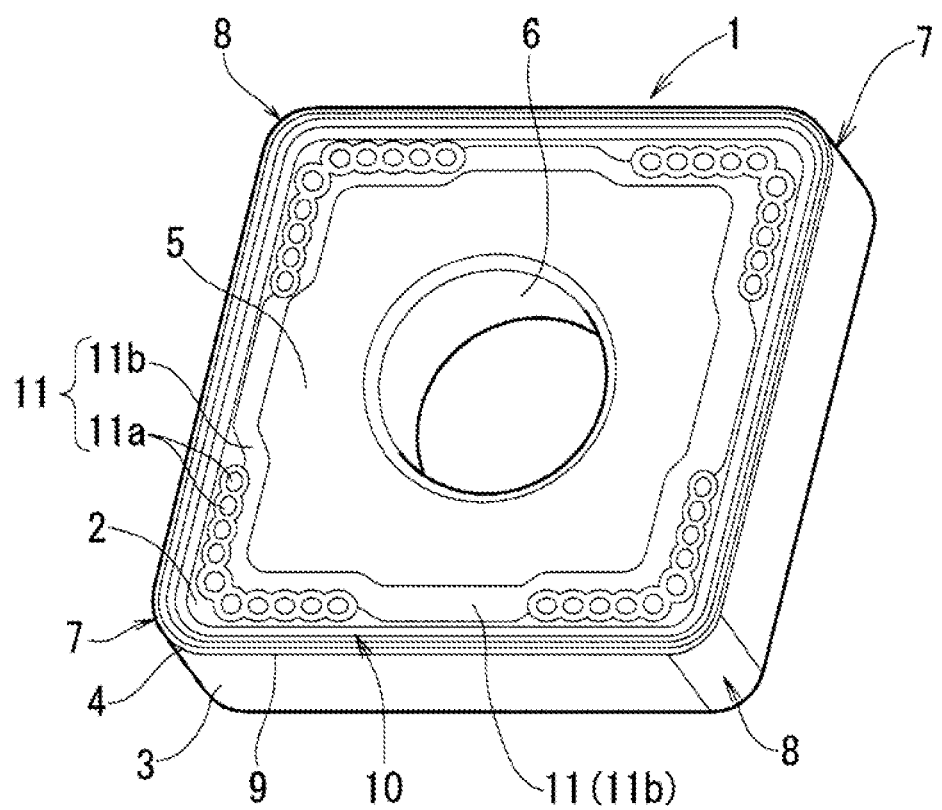
FIG. 1 is a perspective view of an exemplary cutting insert according to the present invention.
Figure 2:
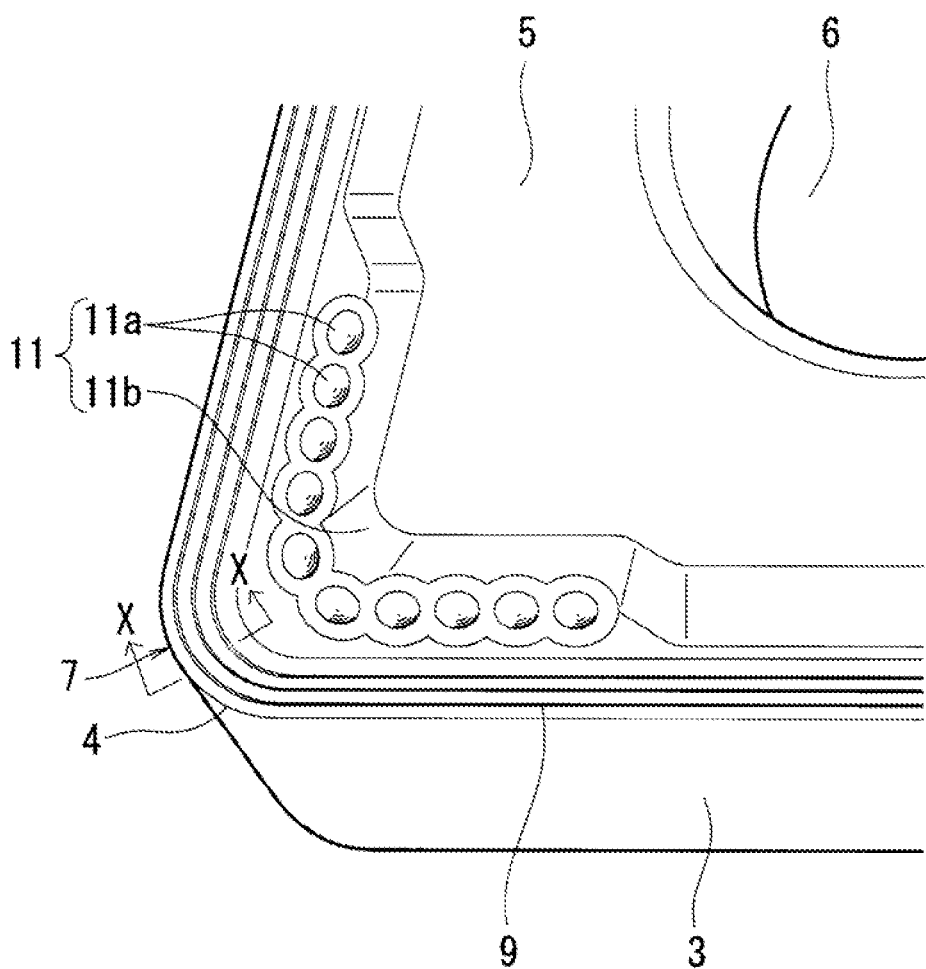
FIG. 2 is an enlarged perspective view of a round corner portion at an acute-angle corner of the cutting insert illustrated in FIG. 1.

An embodiment of the cutting insert according to the present invention will now be described with reference to FIGS. 1 to 3 attached. A cutting insert 1 illustrated as an example is a diamond-shaped indexable insert. The cutting insert 1 includes a rake face 2 forming an upper face or a lower face, a flank face 3 forming a set of side faces, and a cutting edge 4 forming the ridge line at the intersection of the rake face and the flank face.

The cutting insert 1 further includes a central land portion 5 provided on the rake face 2, an attaching hole 6 extending through the center (the centers of the upper and lower faces) of the central land portion, round corner portions 7 corresponding to corners having an acute angle, round corner portions 8 corresponding to corners having an obtuse angle, a flat land 9 provided on the rake face 2 and providing the cutting edge 4 at the boundary thereof with respect to the flank face 3, and a breaker flute 10 that is continuous with the land. Breakers 11 are provided on a side of the breaker flute 10 that is nearer to the central land portion 5.

The cutting insert 1 illustrated as an example includes the cutting edge 4 extending over the entire peripheral edge of the upper face or the lower face. The land 9 and the breaker flute 10 also extend along the entirety of the cutting edge 4.

The breakers 11 at the round corner portions 7 and 8 are each a combination of a plurality of spherical breaker projections 11a, which are arranged along the cutting edge 4, and a breaker wall 11b, which extends obliquely upward from behind the breaker projections 11a toward the central land portion 5 up to a position that is higher than the breaker projections 11a. In a central part of each of linear portions of the cutting edge between adjacent ones of the corner portions, only the breaker wall 11b is present by making the breaker wall 11b protrude toward the cutting edge. Although chips are treated even without the breaker projections 11a, the chip-treatment performance is improved by providing the breaker projections 11a.

The attaching hole 6 is not essential. While the land 9 and the breaker flute 10 of the cutting insert 1 illustrated as an example are each present at the round corner portions 8 corresponding to the corners having an obtuse angle, the land and the breaker flue may be omitted at the round corner portions corresponding to the corners having an obtuse angle.

While the land 9 of the cutting insert illustrated is a surface that is perpendicular to the flank face 3 (a surface that is at an inclination of 0°), the land 9 may be a land that is at a slight inclination (3° or smaller, for example). A width T of a portion of the land 9 that extends along a portion of the cutting edge that is at each of the round corner portions is larger than 0.05 mm and smaller than 0.15 mm. By setting the width T of that portion of the land to 0.05 mm or larger, an effect that is expected to increase the strength of an edge portion is produced. The width T of the land extending along the cutting edge excluding those portions at the round corner portions may be 0.15 mm or larger.

By making the width T of the portion of the land extending along the cutting edge at each of the round corner portions smaller than 0.15 mm, a deterioration in the function of breaking chips and a reduction in the sharpness that are attributed to the excessively large width of the land are avoided.

More preferably, the width T of the land 9 may be 0.07 mm≤T<0.1 mm. In such a case, the deterioration in the function of breaking chips and the reduction in the sharpness are further suppressed. Particularly, if the depth of cut is large, it is more preferable to set the width T of the land to a relatively large value (0.10 mm≤T<0.15 mm).

The breaker flute 10 first extends down and from the inner end of the land 9 and then curves upward at the terminal end thereof. A sloping surface 10a that is on a land side (on the side of the starting end) and forms a downslope in a direction away from the cutting edge 4 has a plurality of crest portions 12 illustrated in FIG. 3 that are arranged side by side in the depth direction of the breaker flute 10.

The crest portions are provided at least at those round corner portions that contribute to cutting. The crest portions 12 extend along the land 9, parallel to the cutting edge 4, along the entire portion of the cutting edge at each of the above round corner portions (in such a manner as to be present over the entirety of each of those portions the cutting edge that contribute to cutting).

The crest portions 12 illustrated are each formed at the intersection of two inclined surfaces A and B having respectively different rake angles. The crest portions 12 may each have a shape including, between the inclined surfaces A and B, a surface that removes the sharp ridge line at the top thereof. At least one of the inclined surfaces has a rake angle θ of larger than 20°.

Figure 3:
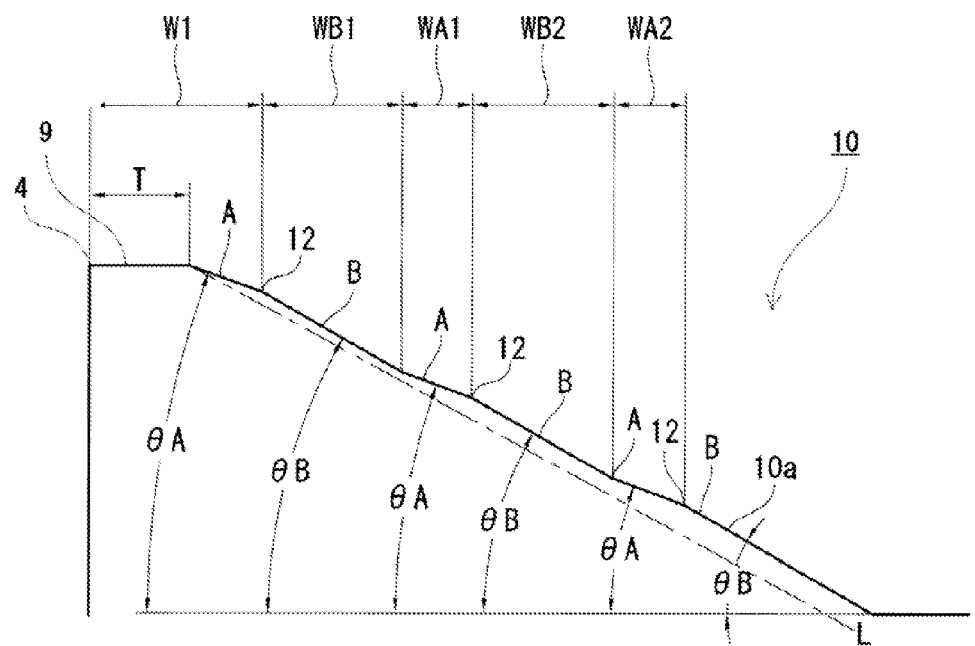
FIG. 3 is an enlarged sectional view taken along a line X-X illustrated in FIG. 2.

In each of the crest portions 12 illustrated in FIG. 3, a rake angle θB of the inclined surface B is larger than a rake angle θA of the inclined surface A, and a width WA of the inclined surface A is smaller than a width WB of the inclined surface B. Thus, the inclined surface B having the larger rake angle functions as a substantial rake face.

The plurality of crest portions 12 that satisfy two conditions of θA<θB and WA<WB are arranged side by side in the depth direction of the breaker flute 10, whereby the thickness near the edge is increased. A flute surface of the breaker flute 10 that is on the land side and that has no crest portions inclines at the same angle as the inclined surface B as represented by a line L illustrated in FIG. 3. Compared with this flute surface, a set of portions that are above the line L corresponds to the amount of insert material that is increased. With the increase in the insert material, the resistance to crater wear is increased without reducing the sharpness.

It is preferable to set the rake angles θA and θB of the inclined surfaces A and B to θA≥20° and θB≥30°, respectively. Thus, the effect of increasing the strength while maintaining the sharpness is expected to increase. Although no specific upper limit is defined, it is preferable to satisfy θ≤60° so as to provide a certain level of strength.

EXAMPLES

A diamond-shaped, negative-coated cutting insert conforming to International Standards Organization (ISO) No.

CNMG120412 (a cemented-carbide base material containing zirconium that is of side 12.7 mm and has an edge corner angle of 80°) was prepared experimentally. The experimental product included, as illustrated in FIG. 1, a plurality of spherical breaker projections 11a arranged along the cutting edge 4 at each of the round corner portions 7 and 8, and a breaker wall 11b extending obliquely upward from behind the breaker projections 11a toward the central land portion 5 up to a position higher than the breaker projections 11a. Furthermore, as illustrated in FIG. 3, three crest portions were provided side by side in the depth direction of the flute on a sloping surface of the breaker flute that was on the land side.

The dimensions of the portions illustrated in FIG. 3 were as follows.

Invented Product 1
  Width T of the land along the cutting edge at the round corner portion: 0.09 mm (constant)
  Length W1 in the flute-width direction from the cutting edge 4 to the terminal end of the highest one of the inclined surfaces A: 0.12 mm
  Lengths WB1 and WB2 of the inclined surfaces B in the flute-width direction forming the respective crest portions 12: 0.1 mm and 0.1 mm, respectively
  Lengths WA1 and WA2, in the flute-width direction, of the inclined surfaces A forming the second and third ones of the crest portions 12 counting from the top: 0.05 mm and 0.05 mm, respectively
  Rake angle θA of the inclined surfaces A: 20°
  Rake angle θB of the inclined surfaces B: 30°

Invented Product 2
  Width T of the land along the cutting edge at the round corner portion: 0.07 mm (constant)
  Other specifications were the same as those of Invented Product 1. The width T of the land along the cutting edge at the round corner portion was measured on the bisector of the round corner.

Comparative Products 1 to 7 described below were also prepared with the same specification as Invented Product 1, except the following.

Comparative Product 1
  Width T of the land along the cutting edge at the round corner portion: 0.2 mm (constant)
  Presence of any crest portions on the flute surface of the breaker flute: Yes
  Rake angle of the flute surface of the breaker flute: 16°

Comparative Product 2
  Land width: 0.16 mm (constant)
  Presence of any crest portions on the flute surface of the breaker flute: No Rake angle of the flute surface of the breaker flute: 18°

Comparative Product 3
  Land width: 0.15 mm (constant)
  Presence of any crest portions on the flute surface of the breaker flute: No
  Rake angle of the flute surface of the breaker flute: 20°

Comparative Product 4
  Land: None
  Presence of any crest portions on the flute surface of the breaker flute: No
  Rake angle of the flute surface of the breaker flute: 18°

Comparative Product 5
  Land: None
  Presence of any crest portions on the flute surface of the breaker flute: No
  Rake angle of the flute surface of the breaker flute: 14°

Comparative Product 6
  Land: one
  Presence of any crest portions on the flute surface of the breaker flute: No
  Rake angle of the flute surface of the breaker flute: 30°

Comparative Product 7
  Land width: 0.05 mm (constant)
  Presence of any crest portions on the flute surface of the breaker flute: Yes
  Rake angle θA of the inclined surfaces A forming the crest portions: 30°
  Rake angle θB of the inclined surfaces B: 35°

Using the above invented products and comparative products, a titanium alloy as a composite expressed as Ti—6Al—4V was cut under the following conditions.

Cutting conditions
  Cutting speed V: 65 m/min
  Feed rate f: 0.2 mm/rev
  Depth of cut ap: 2.5 mm
  Mode of cutting: wet As a result of the experiment, Comparative Products 1 to 3 had longer tool lives than the other comparative products. However, the three all exhibited poor chip-treatment performance, generating long unbroken chips.

Comparative Products 4 and 5 exhibited better chip-treatment performance but had shorter tool lives than Comparative Products 1 to 3.

Comparative Products 6 and 7 exhibited better chip-treatment performance than Comparative Products 4 and 5 but, as with Comparative Products 4 and 5, had shorter tool lives than Comparative Products 1 to 3.

In contrast, Invented Products 1 and 2 were superior to all of the comparative products both in chip-treatment performance and in tool life. The grade of chip-treatment performance was determined with reference to that of Comparative Product 4, which exhibited the best results among all of the comparative products. The grade of tool life was determined with reference to those of Comparative Products 1 to 3, which exhibited the best results among all of the comparative products. The results of the experiment are summarized in Table 1.

TABLE I

|  | Comparative product 1 | Comparative product 2 | Comparative product 3 | Comparative product 4 | Comparative product 5 | Comparative product 6 | Comparative product 7 | Invented product 1 | Invented product 2 |
|---|---|---|---|---|---|---|---|---|---|
| Land width (mm) | 0.2 | 0.16 | 0.15 | None | None | None | 0.05 | 0.09 | 0.07 |
| Rake angle (°) | 16 | 18 | 20 | 18 | 14 | 30 | 30-35 | 20-30 | 20-30 |
| Chip-treatment performance | E | E | E | C | D | A | A | A | A |
| Tool life | C | C | C | E | E | E | E | B~A | B~A |

A: Excellent B: Better than reference C: Reference D: Worse than reference E: Bad

Example 2

A machining experiment was conducted using Invented Product 1 used in Example 1 above, Invented Product 3 obtained by changing the width T of the land at the round corner portion of Invented Product 1 to 0.12 mm with the width of the other portions of the land being 0.15 mm, and Comparative Product 1. The experiment was conducted under the same conditions as in Example 1, except that the depth of cut ap was 5.0 mm and the feed rate f was 0.25 mm/rev.

While Invented Product 3 exhibited good results both in chip-treatment performance and in tool life, Invented Product 1 exhibited lower durability than Invented Product 3. Furthermore, while Comparative Product 1 had a tool life equivalent to that of Invented Product 1, the chip-treatment performance was lower than that of Invented Product 1.

TABLE II

|  | Comparative Product 1 | Invented Product 1 | Invented Product 3 |
|---|---|---|---|
| Land width (mm) | 0.2 | 0.09 | Round corner: 0.12 Side: 0.15 |
| Rake angle (°) | 16 | 20-30 | 20-30 |
| Chip-treatment performance | E | A | A |
| Tool life | C | C | B |

A: Excellent B: Better than reference C: Reference D: Worse than reference E: Bad

Example 3

A machining experiment was conducted using Invented Product 3 used in Example 2 above and Comparative Product 8 and Comparative Product 9 that included no lands, and under the following conditions.

Workpiece: inconel 718
Cutting conditions
Cutting speed V: 45 m/min
Feed rate f: 0.25 mm/rev
Depth of cut ap: 5.0 mm
Mode of cutting: wet While Invented Product 3 exhibited good results both in chip-treatment performance and in tool life, Comparative Product 8 and Comparative Product 9 exhibited lower chip-discharging performance and had a shorter tool life.

TABLE III

|  | Comparative Product 8 | Comparative Product 9 | Invented Product 3 |
|---|---|---|---|
| Land width (mm) | None | None | Round corner: 0.12 Side: 0.15 |
| Rake angle (°) | 4 | 15 | 20-30 |
| Chip-treatment performance | E | B | A |
| Tool life | C | D | B~A |

A: Excellent B: Better than reference C: Reference D: Worse than reference E: Bad While the above description concerns an exemplary diamond-shaped cutting insert, the present invention is also applicable to cutting inserts having other regular polygonal shapes such as a regular triangular shape and a regular square shape.

REFERENCE SIGNS LIST 1 cutting insert
2 rake face
3 flank face
4 cutting edge
5 central land portion
6 attaching hole
7,8 round corner portion
9 land
10 breaker flute
11 breaker
12 crest portion on sloping surface of breaker flute

The invention claimed is:

1. A cutting insert having a cutting edge at a round corner portion, the cutting insert comprising: a land and a breaker flute that are provided on a rake face, the land providing the cutting edge by intersecting a flank face, the breaker flute being continuous with the land; and
a breaker on a side of the breaker flute that is nearer to a central land portion,
wherein:
a width T of a portion of the land that extends along a portion of the cutting edge that is at the round corner portion is 0.05 mm<T<0.15 mm, and the width of the portion of the land is constant,
a plurality of crest portions are provided on a sloping surface of the breaker flute, the sloping surface being on a land side and forming a downslope in a direction away from the cutting edge, the crest portions extending along the portion of the cutting edge that is at the round corner portion, the crest portions being arranged side by side in a depth direction of the breaker flute,
a rake angle θ of at least one inclined surface that form each of the crest portions satisfies a condition of θ>20°, and
each of the crest portions provided on the sloping surface of the breaker flute is formed of a first inclined surface and a second inclined surface, each having respectively different rake angles and intersecting each other,
a rake angle θA of the first inclined surface that is on the land side and a rake angle θB of the second inclined surface that is on a breaker side satisfy a condition of θA<θB, a width WA of the first inclined surface and a width WB of the second inclined surface satisfy a condition of WA<WB, and the rake angles θA and θB of the first inclined surface and the second inclined surface are expressed as θA≥20° and θB≥30°, respectively.

2. The cutting insert according to claim 1, wherein the width T of the land falls within a range of 0.07≤mm T<0.15 mm.

3. The cutting insert according to claim 1, wherein the breaker includes a plurality of spherical breaker projections that are arranged along the cutting edge, and a breaker wall that extends obliquely upward from behind the breaker projections toward the central land portion up to a position that is higher than the breaker projections.

4. The cutting insert according to claim 2, wherein the width T of the land falls within a range of 0.07 mm≤T<0.15 mm.

5. The cutting insert according to claim 3, wherein the width T of the land falls within a range of 0.07 mm≤T<0.15 mm.

6. The cutting insert according to claim 1, wherein the breaker includes a plurality of spherical breaker projections that are arranged along the cutting edge, and a breaker wall that extends obliquely upward from behind the breaker projections toward the central land portion up to a position that is higher than the breaker projections.

7. The cutting insert according to claim 1, wherein the breaker includes a plurality of spherical breaker projections that are arranged along the cutting edge, and a breaker wall that extends obliquely upward from behind the breaker projections toward the central land portion up to a position that is higher than the breaker projections.

8. The cutting insert according to claim 2, wherein the breaker includes a plurality of spherical breaker projections that are arranged along the cutting edge, and a breaker wall that extends obliquely upward from behind the breaker projections toward the central land portion up to a position that is higher than the breaker projections.

9. The cutting insert according to claim 4, wherein the breaker includes a plurality of spherical breaker projections that are arranged along the cutting edge, and a breaker wall that extends obliquely upward from behind the breaker projections toward the central land portion up to a position that is higher than the breaker projections.

10. The cutting insert according to claim 5, wherein the breaker includes a plurality of spherical breaker projections that are arranged along the cutting edge, and a breaker wall that extends obliquely upward from behind the breaker projections toward the central land portion up to a position that is higher than the breaker projections.

* * * * *

UNITED STATES PATENT AND TRADEMARK OFFICE
CERTIFICATE OF CORRECTION

PATENT NO. : 9,630,257 B2 Page 1 of 1
APPLICATION NO. : 14/385972
DATED : April 25, 2017
INVENTOR(S) : Yousei Tensaka It is certified that error appears in the above-identified patent and that said Letters Patent is hereby corrected as shown below:

In Column 8, In Claim 2, Lines 2-3, replace "0.07≤mm T<0.15 mm" with --0.07 mm≤T<0.15 mm--

In Column 8, In Claim 4, Line 1, replace "claim 2" with --claim 1--

In Column 8, In Claim 5, Line 1, replace "claim 3" with --claim 1--

Signed and Sealed this
Twenty-ninth Day of August, 2017

Joseph Matal
*Performing the Functions and Duties of the*
*Under Secretary of Commerce for Intellectual Property and*
*Director of the United States Patent and Trademark Office*